No. 11,872. Reissued Nov. 13, 1900.
C. J. VAN DEPOELE, Dec'd.
A. WAHL & C. A. COFFIN, Administrators, Assignors to THOMSON-HOUSTON ELECTRIC COMPANY.
TRAVELING CONTACT FOR ELECTRIC RAILWAYS.
3 Sheets—Sheet 1.
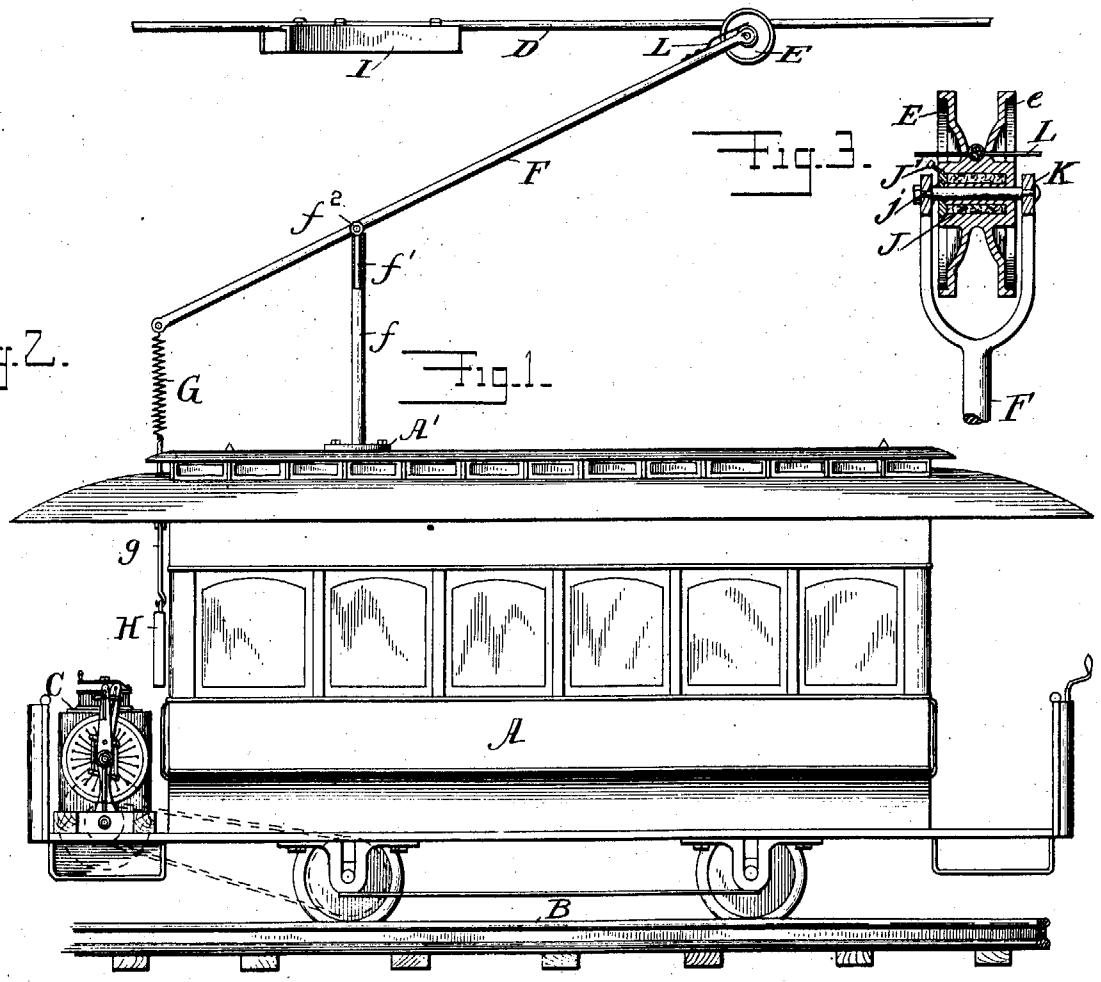
WITNESSES:
F. N. Roehrich
Wm. H. Berrigan Jr.
C. J. VAN DEPOELE,
INVENTOR.
THOMSON-HOUSTON ELECTRIC CO.,
ASSIGNEES:
BY
Betts, Betts, Sheffield & Betts
ATTORNEYS.

No. 11,872. Reissued Nov. 13, 1900.
C. J. VAN DEPOELE, Dec'd.
A. WAHL & C. A. COFFIN, Administrators. Assignors to THOMSON-HOUSTON ELECTRIC COMPANY.
TRAVELING CONTACT FOR ELECTRIC RAILWAYS.
3 Sheets—Sheet 2.
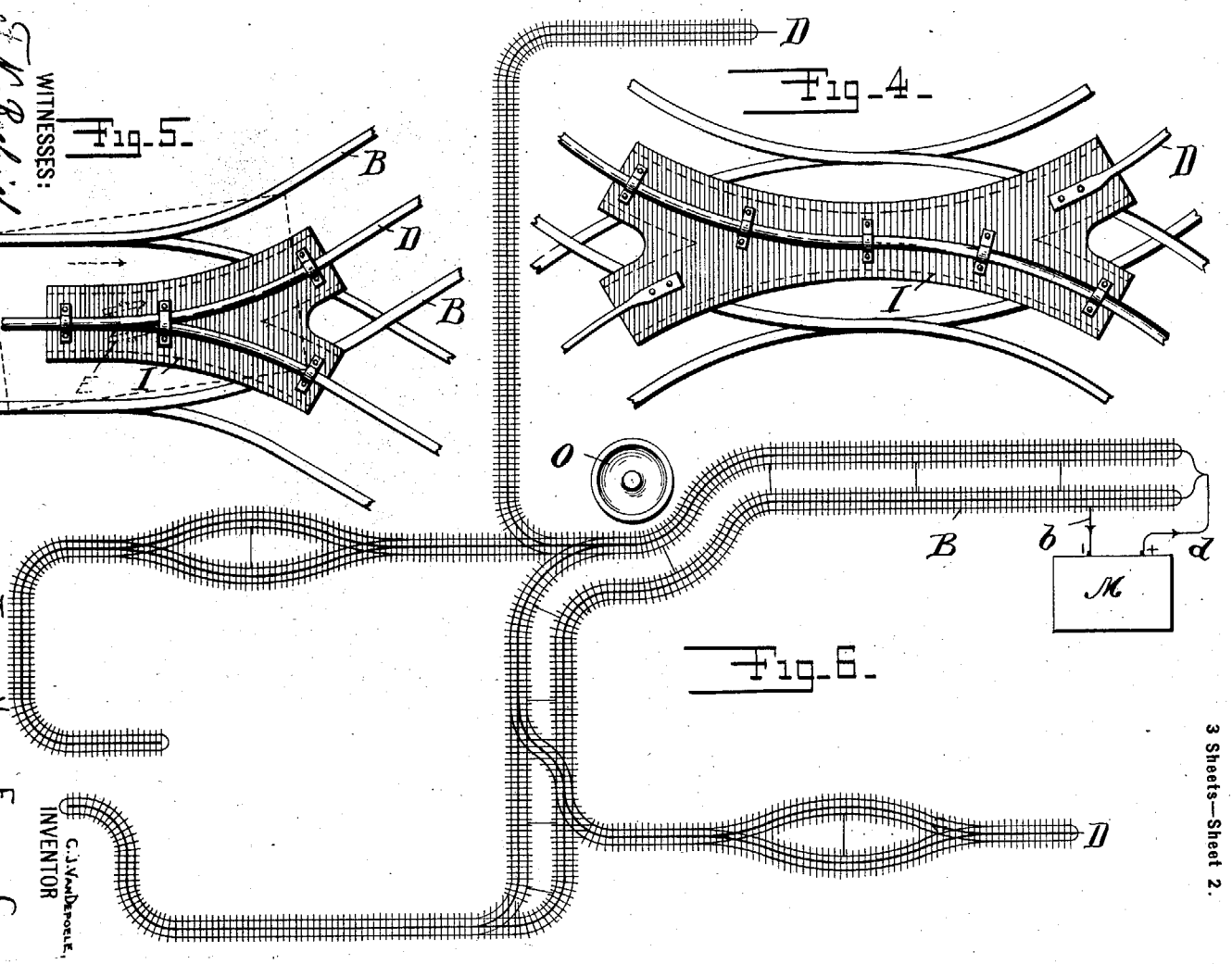
WITNESSES:
F. N. Ruehrich
Henry H. Berringer Jr.
C. J. VanDepoele,
INVENTOR
Thomson-Houston Electric Co.,
Assignees;
BY
Betts, Betts, Sheffield & Betts
ATTORNEYS.

No. 11,872. Reissued Nov. 13, 1900.
C. J. VAN DEPOELE, Dec'd.
A. WAHL & C. A. COFFIN, Administrators, Assignors to THOMSON-HOUSTON ELECTRIC COMPANY.
TRAVELING CONTACT FOR ELECTRIC RAILWAYS.
3 Sheets—Sheet 3.
Fig. 8.
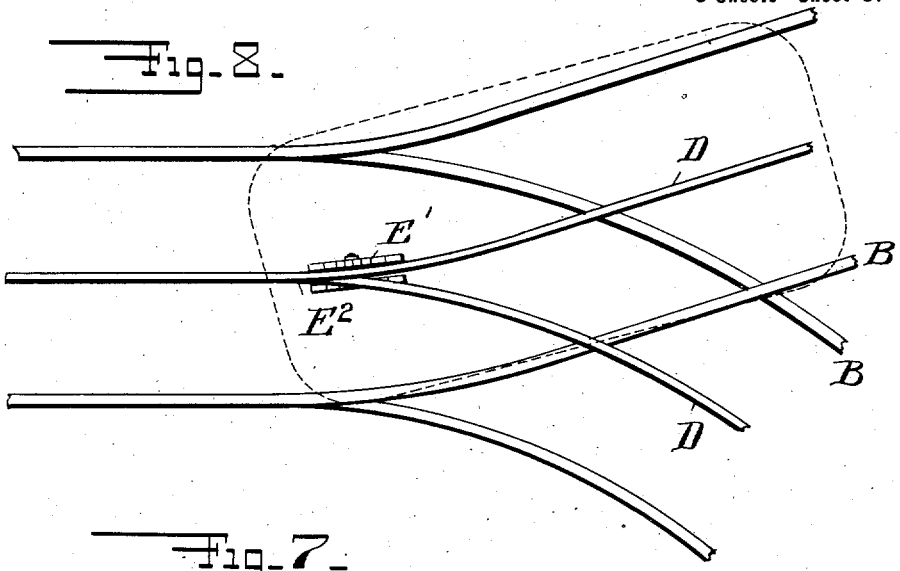
Fig. 7.
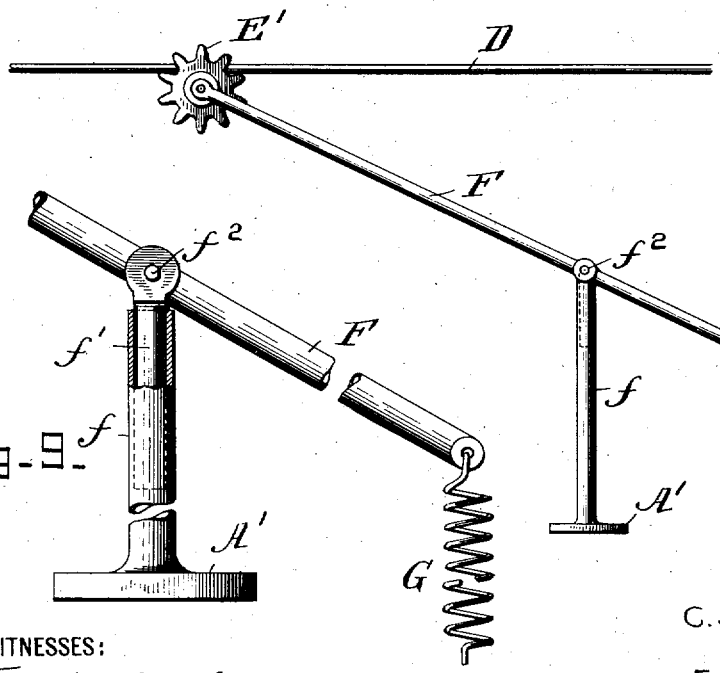
Fig. 9.
WITNESSES:
F. N. Roehrich
Henry H. Bourigan Jr.
C. J. VAN DEPOELE,
INVENTOR
THOMSON-HOUSTON ELECTRIC CO.,
ASSIGNEES,
BY
Betts, Betts, Sheffield & Betts,
ATTORNEYS.

UNITED STATES PATENT OFFICE.

THOMSON-HOUSTON ELECTRIC COMPANY, OF BOSTON, MASSACHUSETTS, ASSIGNEE OF ALBERT WAHL AND C. A. COFFIN, ADMINISTRATORS OF CHARLES J. VAN DEPOELE, DECEASED.

TRAVELING CONTACT FOR ELECTRIC RAILWAYS.

SPECIFICATION forming part of Reissued Letters Patent No. 11,872, dated November 13, 1900.

Original No. 495,443, dated April 11, 1893. Application for reissue filed September 28, 1900. Serial No. 31,461.

*To all whom it may concern:*

Be it known that CHARLES J. VAN DEPOELE, deceased, late a citizen of the United States, residing at Chicago, in the county of Cook and State of Illinois, was the original, first, and sole inventor of certain new and useful Improvements in Traveling Contacts for Electric Railways, of which the following is a specification, reference being had to the accompanying drawings.

The said invention relates to electric railways of the class in which a suspended conductor is used to convey the working current, a traveling contact carried by the car for taking off the current for use in operating the motor by which the car is propelled, and the return circuit completed through the rails.

The invention consists more particularly of an improved traveling contact. This is shown, however, in connection with an improved arrangement and construction of the switches by which the said traveling contact is directed onto the proper conductor; but these devices for switching the traveling contact from one conductor to another have been already claimed in Letters Patent of the United States No. 424,695, which was issued as a division of this application on April 1, 1890, and said devices are not claimed herein; but the description and illustration of them are here retained to show how the traveling contact is adapted to meet one of the essential requirements of railway service without special arrangements or other complications.

The invention also consists in various details of construction and arrangement, which will be hereinafter pointed out.

In the accompanying drawings, Figure 1 is a side elevation of a car provided with the improved contact arm and device, with the special tension device claimed in the aforesaid prior patent, No. 424,695. Fig. 2 is an enlarged detail showing the contact-wheel in position in a switch-box. Fig. 3 is a sectional detail showing the construction of the contact-wheel. Fig. 4 is a top plan view of a portion of track, showing the conductor, a switch-box, and the rails. Fig. 5 is also a plan view and is similar to the preceding, with the addition of a car, shown in dotted lines. Fig. 6 is a diagrammatic representation of an electric-railway system. Fig. 7 shows a modified form of contact-wheel and an arm provided with a tension-spring only. Fig. 8 is a diagrammatic representation thereof. Fig. 9 is an elevation on an enlarged scale, partly in section, showing the vertical and transverse axes upon which the contact-carrying arm is sustained.

Similar letters denote like parts throughout.

The car A is supported upon the track B and provided with a motor C, which is connected with the wheels thereof in any of the methods already described by me.

D is the suspended working conductor, E is the traveling contact-wheel, and F is a hinged arm supported upon a post *f*, secured to or extending upward from the roof of the car. To the lower end of the arm F is attached a suitable tension device; but as the particular form and arrangement of this tension device are not essential to the present invention it need not be further described.

In order that the contact-wheel E shall be compelled to pass from one conductor to a branch or one attached thereto leading in a different direction, the inverted open-bottom metallic boxes I are provided. These are formed with branching compartments and constructed in the form of switches, conforming to the grooves and angles of the track-switches by which the direction of the car is controlled. These boxes are in the form of open smooth curved passages and are free from obstructions within, so that the contact-wheel E, which is slightly depressed on meeting the end of the switch-box, may roll freely therethrough in the desired direction without hindrance.

The conductors D follow the line of the track or tracks and are preferably located centrally above them and at points where the tracks diverge or join the main line. Switch-boxes I are placed, the conductors D coming to the said boxes and being firmly attached to the tops or sides thereof, so that were there no other support provided for them the said conductors would sustain the box in its proper position, which is directly over the ground or track switch.

The switch-box I may take almost any shape and may be made of thin sheet metal or of cast metal, as is most convenient; but the castings are preferred. The contact-wheel E itself is a large deeply-grooved pulley formed with thickened or flanged edges *e* and a deep central groove *i*. The hub of this wheel is further provided with an annular recess or groove J, in which is packed cotton wicking or other absorbent material, the groove being closed by a front plate *j*, which is provided with an oil-hole J′ and a suitable screw for cleaning the same. There is also an oil-hole extending from the groove J to the axis of the wheel, so that one filling will serve to lubricate the wheel for many hours.

The arm F is of a length that will place the contact-wheel E about over the rear pair of wheels of the car, and the position of the post *f* and the length of the arm F itself will therefore vary with the length of the body of the car, the particular proportions shown being only by way of illustration. The arm F is hinged and should in most instances be also pivoted to the top of its post *f*, although an amount of looseness in the hinged joint which will answer the purpose of the pivot, hereinafter described, may be utilized. As shown on an enlarged scale in Fig. 9, the post *f* is formed with a hollow portion or socket at its upper end, although it might be hollow throughout. The forked pivot *f′* is adapted to fit into the upper part of said post *f* and be rotatably sustained therein. The arm F is carried to the forked upper end of the pivot *f′* upon the transverse bolt or pin $f^2$, which passes through said arm and constitutes a transverse axis therefor. Hence the said arm is both hinged and pivoted upon its supporting-post *f*. The post *f* is secured to a suitable base A′, which is fastened upon the top of the car.

In the diagram Fig. 6 M is the generating-station furnishing the electric current for operating the motors on the cars, which current passes to the suspended conductors D by way of conductor *d*, returning to the station by way of the track B and conductor *b*. The possibilities of operation with the improved switch are shown in this diagram, which represents an actual installation in the city of Montgomery, Alabama, the principal curves and several additional switches being necessitated by reason of a large public fountain O. The electric switches I are to be placed directly over their counterparts, the track-switches, and the contact-wheel, as before stated, is to be located above the rear wheel, or, at any rate, back of the vertical center of the car, so that as the front portion of the car swings in the desired direction as the front wheels pass the track-switch the contact-arm will be deflected and the direction of the wheel E correspondingly changed while still on the straight wire, so that on reaching the switch-box the wheel will be depressed and pass thereinto and naturally pass through and out of the proper compartment thereof. The switch-boxes I, being connected directly to the conductors D, are similarly changed, and when the wheel E is passing therethrough the current passes through the box I, and thence into the contact-wheel through its flanges *e*, passing thence through the arm F or a separate conductor to the motor C. Since there are no moving tongues or springs or points to catch or impede the progress of the wheel when three or four grooves, as the case may be, exist in one switch-box, the wheel will intersect the grooves and pass along in the desired direction without any difficulty whatever, its direction being previously indicated by the movement of the front portion of the car. Thus it will be seen that by locating the traveling contact-wheel in the position shown or one equivalent thereto all the difficulties of switching from conductor to conductor are obviated and with the smallest possible amount of special construction.

In Figs. 7 and 8 is shown a modification of the foregoing in which a star-wheel E′ takes the place of the contact-wheel E, and the suspended conductors are permanently connected together above the track-switches, as at *e′*, the result being that as the front part of the car swings onto the diverging track the teeth of the wheel will catch across the joint of the wires and by preventing the contact-wheel slipping sidewise, as it would at that moment be otherwise liable to do, its passage onto the conductor above the track upon which the car is is assured. This special form of wheel forms the subject of a division of this application, Patent No. 424,910, and hence is not specifically claimed herein as such.

The contact-carrying arm described and claimed in the present application possesses substantial practical advantages over any other means yet proposed for establishing moving contact between a vehicle and a stationary supply-conductor in that by the use of a hinged flexibly-mounted arm much greater freedom of movement is compatible with the maintenance of a positive mechanical connection and electrical contact between the vehicle and supply-conductors.

In a previous application filed June 22, 1885, Serial No. 169,410, (see Patent No. 403,801,) said Charles J. Van Depoele, deceased, has shown and described a contact device consisting of a grooved roller mounted upon a spring and sustained thereby a short distance above the roof of the car; but this was in practice found deficient in capacity to follow the sinuosities and deflections of the overhead conductor as ordinarily put up, and, moreover, necessitated the conductor being supported in inconvenient proximity to the ground, and it also required for its operation a conductor suspended with substantially impracticable accuracy above an ideal track. By the use of such an arm as herein described, which may be of any suitable length, the conductor is supported at a height entirely out of the way of passing teams and the like, and, moreover, the outer end of the arm being the longest may also swing laterally through a distance of several feet to follow deflections or bends in the conductor without undue or injurious strain upon its pivotal connections. Another great advantage is found in the fact that the outer end of an arm such as described will maintain its contact under great variations of height of conductor, as well as lateral displacement thereof, and may even be depressed to a horizontal position where it is desired to pass under bridges, into buildings, or other places where it may be desirable to place the conductor in a lower plane than in the other portions of the track.

Many modifications and minor changes in the invention just described will readily suggest themselves to persons skilled in the art, and the improvement is not limited to the precise details of construction or arrangement shown, as they may be modified without departing from the scope of the invention.

The combination with the contact-carrying-arm of a weighted spring, or of a weight and spring, as the special means for holding the contact-arm pressed upward and of enabling the motorman to lower the contact-wheel are not claimed herein, because this special improvement has been already claimed in the Patent No. 424,695, dated April 1, 1890, which was issued as a division of this application. Nor is there claimed herein the so arranging of a weight or spring (as by causing it to work through suitable grooves or rollers arranged in the car-roof) as to tend to cause the arm to assume a normal central position, or one parallel with the longitudinal center of the car, as that has also been already claimed in said divisional patent, No. 424,695, being an arrangement which is of especial value only in connection with the switches to which said divisional patent more particularly relates.

In the present application no special form or arrangement of tension device is essential to or a part of the invention claimed.

What is claimed as the invention of said CHARLES J. VAN DEPOELE is—

1. In an electric railway, the combination of a car, an overhead conductor above the car, an upwardly-extending and laterally-swinging arm mounted on the roof of the car, and carrying a contact device at its free end and making underneath contact with the conductor, substantially as described.

2. In an electric railway, the combination of a car, an electric overhead conductor above the car and parallel with the line of travel, an upwardly-extending trailing arm carrying a contact device at its free end, adapted to make underneath contact with the conductor, said arm being supported on the car on vertical and transverse axes, so as to permit said contact device to follow the position of the conductor, notwithstanding great variations of height and of lateral displacement thereof, substantially as described.

In testimony whereof the THOMSON-HOUSTON ELECTRIC COMPANY, assignee of the entire interest of the said CHARLES J. VAN DEPOELE, deceased, has caused its corporate seal to be affixed and attested by the signatures of C. A. COFFIN, its president, and M. F. WESTOVER, its secretary, this 31st day of July, 1900.

[L. S.] THOMSON-HOUSTON ELECTRIC COMPANY,
By C. A. COFFIN,
*President.*

Attest:
M. F. WESTOVER,
*Secretary.*

Witnesses:
JAMES J. COSGROVE,
WM. H. BERRIGAN, Jr.